United States Patent Office
3,106,980
Patented Oct. 15, 1963

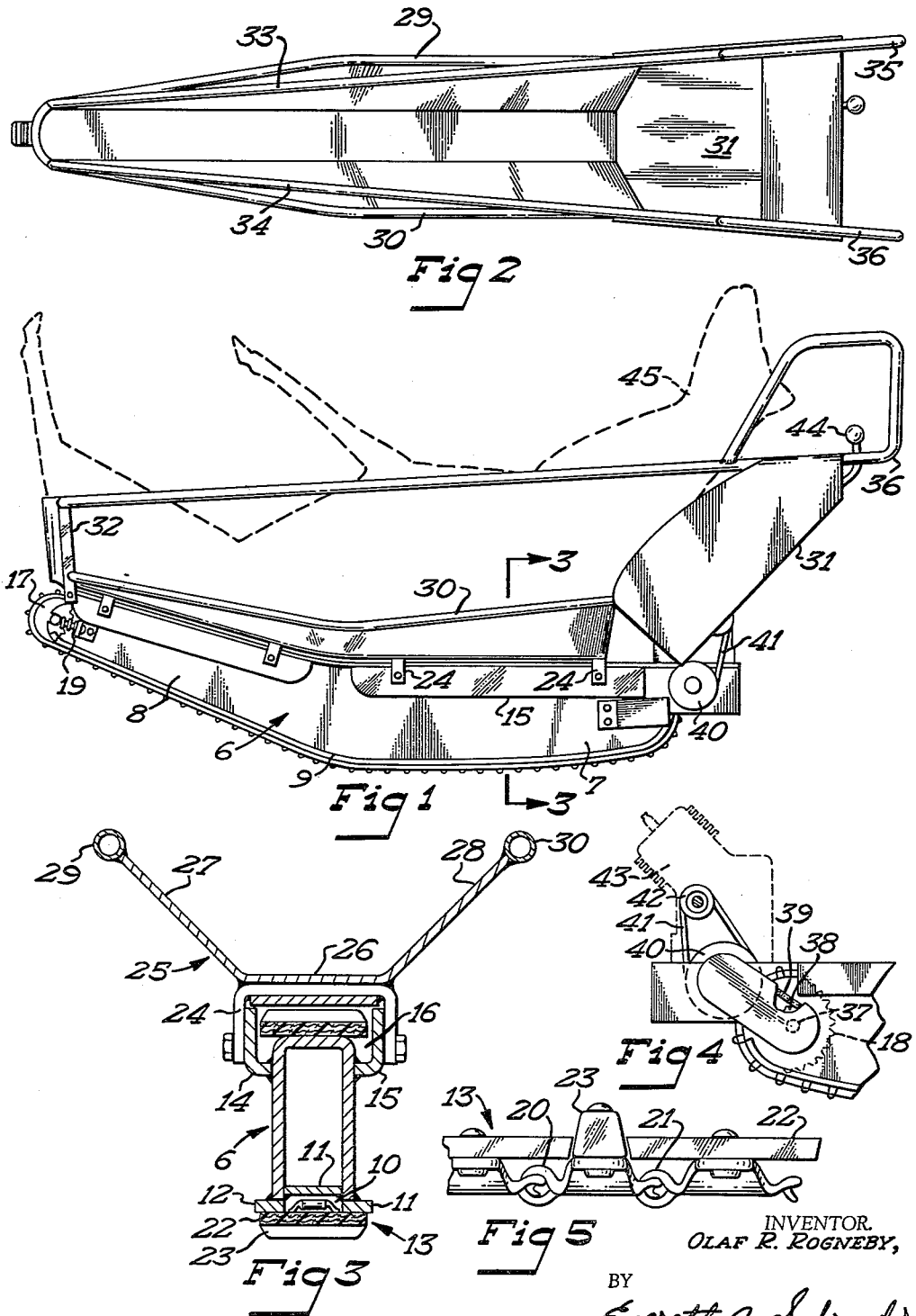

3,106,980
SELF-PROPELLED ENDLESS-TRACK VEHICLE FOR TRAVERSING WOODED ROUGH TERRAIN
Olaf R. Rogneby, Evansville, Minn.
Filed Apr. 17, 1961, Ser. No. 103,466
8 Claims. (Cl. 180—9.22)

This invention relates to self-propelled vehicles. More particularly, it relates to self-propelled vehicles of the type designed for travel across rough terrain and through relatively inaccessible locations such as deer-hunting areas.

The most difficult problem plaguing deer hunters is the extreme difficulty involved in removing the deer carcass to camp or to the hunter's automobile from the relatively inaccessible areas in which the deer is most frequently shot. Such areas are frequently heavily covered with underbrush and are of rough topography and, therefore, involve a great deal of work and effort when it becomes necessary to remove the carcass of a deer from a point a number of miles away to the final location. Removal of the deer's carcass is oftentimes complicated by a very substantial depth of snow so that it is often extremely difficult to transfer the deer from the point at which it is shot to the ultimate location. This is particularly true when the deer is a large one. Likewise, rescue operations for wounded deer hunters becomes extremely complicated in such areas because of the difficulty of moving the body of the injured person quickly, easily, and with a minimum of discomfort to the patient. My invention is designed to very effectively solve this problem.

It is a general object of my invention to provide a novel and improved self-propelled vehicle uniquely designed for travel across rough terrain and through relatively inaccessible areas.

A more specific object is to provide a novel and improved self-propelled vehice constructed and arranged to geatly facilitate the removal of a body or carcass from relatively inaccessible areas such as those in which there is heavy underbrush and rough terrain.

Another object is to provide a novel and improved self-propelled vehicle constructed and arranged to greatly facilitate guiding such a vehicle through relatively inaccessible and non-traversable areas so as to expedite and facilitate removal of bodies from such areas.

Another object is to provide a novel and improved self-propelled vehicle designed for the removal of bodies from relatively inaccessible areas which is simple and inexpensive in construction, operation, service, maintenance, and repair.

Another object is to provide a novel and improved self-propelled vehicle constructed and arranged to enable the same to readily pass through heavy underbrush, soft mud, or deep snow without danger of miring and in such a manner as to facilitate the travel of the operator through these areas.

Another object is to provide a novel and improved self-propelled vehicle for removing bodies from relatively inaccessible locations having a cradle member which serves a dual function in supporting the body and functioning as a toboggan when deep snow is encountered.

Another object is to provide a novel and improved self-propelled vehicle for removing bodies from relatively inaccessible areas provided with a unique and novel propelling crawler-type track constructed and designed to inherently prevent the collection of snow and ice between the links thereof and to consequently function in a highly improved manner as compared to tracks of this type heretofore known.

These and other objects and advantages of this invention will more fully appear from the following description, made in connection with the accompanying drawings, wherein like reference characters refer to the same or similar parts throughout the several views, and in which:

FIG. 1 is a side elevational view of one embodiment of my self-propelled vehicle for removing bodies from relatively inaccessible locations.
FIG. 2 is a plan view thereof.
FIG. 3 is a vertical sectional view taken along line 3—3 of FIG. 1.
FIG. 4 is a fragmentary side elevational view of the rear end portion thereof on a larger scale and with portions thereof broken away, taken from the opposite side of that shown in FIG. 1, and
FIG. 5 is a fragmentary side elevational view of a short section of the crawler type track on an enlarged scale.

The embodiment shown in FIGS. 1–5 includes a narrow elongated rigid frame or shoe 6 which has a horizontal rear section 7 approximately 2.5 feet in length and having a forward section 8 which extends upwardly and forwardly from the horizontal section 7 and is slightly less in length than that section. In constructing this device the forward section 8 must be at least half the length of the horizontal section 7 in order that the center of gravity will be disposed immediatey adjacent the point of angulation between the sections 7 and 8 as indicated by the numeral 9.

As best shown in FIG. 3 the narrow frame member 6 includes an elongated member which has an inverted U-shape in cross section and forms a channel identified by the numeral 10 in cooperation with an elongated plate 11 that is recessed inwardly of the lower ends of the element 6 and welded thereto. Flange members 11 and 12 are welded to the lower edges of the U-shaped members 6 as shown in FIG. 3 and extend laterally outwardly therefrom to provide a bearing surface for the crawler-type track which has been indicated generally by the numeral 13.

Welded to the upper portions of the element 6 and extending longitudinally thereof is a pair of elongated flange elements 14 and 15 which together with the element 6 form an upwardly facing channel 16. As best shown in FIG. 3, these flange elements 14 and 15 extend laterally outwardly and then upwardly to define the channel 16 within which the upper run of the track 13 passes, the track 13 bearing upon the upper surface of the element 6.

The track 13, as best shown in FIG. 3, is narrow and of the crawler type. It is continuous and is trained around the element 6 and a forwardly disposed sprocket member 17 and a rearwardly disposed drive sprocket 18. Each of these sprockets 17 and 18 are mounted on the forward and rearward ends respectively of the frame member 6 and the former is spring loaded as shown at the forward end of the device in FIG. 1 and identified by the numeral 19.

The track 13 is comprised of a plurality of interlocking links such as indicated by the numerals 20 and 21. As best shown in FIG. 5 these links are of the type which are pivotally connected to the adjacent link so that they may be entrained around the sprockets 17 and 18 and be driven by the latter when it is rotated to cause the track to propel the device across terrain. As shown in FIG. 5, every other link 20, 21 carries a flexible flat pad 22 which is fixedly secured to the intermediate portions of the link as shown. This pad 22 is preferably formed of a flexible material such as heavy belting. The links intermediate the pads 22 each carries a cleat 23 which extends transversely of the track and extends outwardly beyond the pads 22. The cleats 23, as shown in FIG. 5 have dimensions extending longitudinally of the track 13 which are substantially less than those of the pads 22. These cleats 23 are also preferably formed of a somewhat rigid but flexible material such as the material from which automobile tires are manufactured.

I have found that the preferred width of the track 13 and the frame member 6 are about three inches although the device will function with the track having a width within a range of two-six inches. The preferable width, however, is three inches in that the narrower the track and frame member 6 are, the more readily the vehicle will pierce heavy underbrush and travel across rough terrain with difficulty. Care must be taken, however, that sufficient width is provided so that the track 13 and the frame member 6 will not unnecessarily pierce the terrain to place an unwarranted load upon the source of driving power. In that connection I have found that a width of three inches is very desirable. The vertical height of the frame member 6 is preferably about eight inches although this height may vary somewhat. It is desirable, however, to not utilize an element 6 having too great height for, of course, the greater the elevation of that element, the higher the center of gravity will be and hence the more difficult it will be to maintain the machine in an upright position when a heavy load is carried.

Mounted upon the frame member 6 by means of a plurality of inverted U-shaped brackets 24 is a cradle member indicated generally by the numeral 25. This cradle member 25 includes a bottom or pan 26 which has flat imperforate laterally extending portions 27 and 28 that extend outwardly from opposite sides of the frame member 6 and terminate in longitudinally extending tubular elements 29 and 30 as best seen in FIG. 3. It will be noted that the laterally extending portions 27 and 28 have smooth flat undersurfaces which diverge upwardly and outwardly. The rear portion 31 of the bottom 26 extends upwardly and rearwardly as best shown in FIGS. 1 and 2. The entire cradle member 25 increases in width rearwardly as can best be seen by reference to FIG. 2. It also includes an upstanding front end member or neck portion 32 from which a pair of rails 33 and 34 extend rearwardly and outwardly. These transversely spaced rails 33 and 34 terminate in loop elements 35, 36 which constitute handles for the machine and extend upwardly and rearwardly from the cradle 25.

The drive sprocket 18 is drivably connected by its shaft 37 with a sprocket 38 which in turn is driven by a chain 39 that extends upwardly and rearwardly to a sprocket (not shown) that is carried by the pulley 40 which in turn is driven by the belt 41 that passes around the drive pulley 42 of a motor 43. Motor 43 is preferably one of the well known gasoline compression type motors and is provided with controls 44 disposed adjacent the handles 35, 36.

In use the carcass of the deer which is indicated in broken lines in FIG. 1 and identified by the numeral 45 is placed within the cradles 25, as shown. This is accomplished by tilting the device on its side and rolling the carcass 45 into the interior of the cradle member 25 and then raising the machine to an upright position such that the weight thereof is born by the track 13. With the motor 43 running and driving the drive sprocket 18, the track 13 will propel the machine through unusually difficult terrain such as that in which the underbrush is very heavy, the operator merely guiding the device by manipulation of the handles 35, 36. Because a single track is utilized this device can be very easily steered, particularly when a slight upward lift is applied to the handle members 35 and 36 to thereby cause almost the entire weight of the machine to be borne by the area immediately adjacent the lead line of the numeral 9 as viewed in FIG. 1.

I have found that a device of this type generally facilitates the removal of a deer carcass or the body of an injured man so that it may be accomplished very quickly and easily and efficiently. In the event of rescue work such as that involving the removal of an injured hunter, the patient can rest very easily while being removed from the hunting area and the entire operation can be completed in a greatly reduced amount of time. It will be noted that in normal travel the weight of the machine is born by the horizontal section 7 and the track extending therebeneath. The dimensions of the forward and rearward sections 7 and 8 are important, as hereinbefore pointed out in order that the center of gravity will be disposed adjacent the numeral 9, as viewed in FIG. 1, thereby facilitating steering of the machine. Toward this end, the forward section 8 which extends upwardly should be at least one-half as long as the horizontal section 7.

The handle elements 35, 36 are loop members for a definite purpose for they enable the operator to more effectively hold on to the machine while traveling through gulleys and other unusually rough terrain. In such instances the operator merely needs to concentrate upon maintaining his footing and maintaining the machine in an upright position for the machine will pull him along through the underbrush and across the rough terrain.

When deep snow is encountered the bottom member 26 functions as a toboggan for substantially the entire weight of the machine will be born by the upwardly and outwardly extending portions 27 and 28 while the track member 13 will provide ample engagement with either the snow or the ground (depending upon the depth of the snow) to cause the machine to move across the snow. Thus it can be seen that it does not matter whether there is a heavy snow cover across the terrain or not for in either event, this device will readily remove bodies from relatively inaccessible areas at a great saving of time, effort, inconvenience, and in the case of an injured hunter, pain.

It should be noted that the track 13 is so constructed as to preclude the formation and collection of ice between the links thereof and are constructed so as to prevent snow and ice from working into the interior of the channels 10 and 16. Reference to FIG. 5 shows that the ends of the pad members 22 are angulated so as to be in close proximity to the lateral surfaces of the lugs 23. It will also be noted that these pads 22 are formed of flexible materials so that when they pass around the sprockets 17 and 18 they flex and cause any ice which may have formed thereon during its movement between the ends of the frame member 6 to crack away and fall free of the track 13.

It will also be noted that the entire machine increases in width rearwardly. This is important in that the forward end of the device separates the underbrush and thereafter the guide rails 33, 34 and the pan member 26 gradually spreads the brush so that the device is designed and constructed to move through unusually difficult terrain. In addition, the track member 13 in combination with the bottom 26 functions in such a manner as to insure that the machine will move through either heavy snow or mud with equal ability such that there is no travel conditions through which this machine will not readily remove the carcass of a deer or the body of an injured hunter.

It will, of course, be understood that various changes may be made in the form, details, arrangement and proportions of the parts without departing from the scope of this invention which consists of the matter shown and described herein and set forth in the appended claims.

What is claimed is:

1. A self-propelled vehicle for removing bodies from brushy relatively inaccessible locations comprising a narrow elongated rigid frame member having a horizontally extending rear section and a forwardly and upwardly extending forward section and having upper and lower longitudinally extending track-bearing surfaces, a single narrow crawler-type continuous track trained around and revolvably mounted upon said frame member in driving and encircling relation and extending longitudinally thereof and ahead of the remainder of the vehicle and bearing against said surfaces, a relatively broad cradle member superimposed relative to said frame member and extending longitudinally thereof in supported relation thereto and being tapered outwardly from front to rear, self-contained power means carried by said frame and connected to said track in driving relation to cause the same to revolve about said frame member and thereby propel the same across terrain, and handle means carried by one of said members adjacent the rear of said frame member for maintaining the vehicle in upright position and guiding the same across rough and relatively inaccessible terrain.

2. A self-propelled vehicle for removing bodies from brushy relatively inaccessible locations comprising a narrow elongated rigid frame member having a horizontally extending rear section and a forward section extending forwardly and upwardly therefrom, said frame member having upper and lower longitudinally extending track-bearing surfaces, narrow crawler-type track means trained around said forward and rearward sections of said frame member and revolvably mounted thereupon in driving and encircling relation and extending longitudinally thereof and bearing against said surfaces and extending upwardly and forwardly along said forward section of said frame member, a relatively broad cradle member superimposedly mounted on said frame member and extending longitudinally thereof and being tapered outwardly from front to rear, self-contained power means carried by said frame and connected to said track means in driving relation to cause the same to revolve about said frame member and thereby propel the same across terrain, and handle means carried by one of said members adjacent the rear of said frame member for maintaining the vehicle in upright position and guiding the same across rough and relatively inaccessible terrain.

3. The structure defined in claim 2, wherein the transverse dimensions of said frame member are 2-6 inches.

4. The structure defined in claim 2, wherein the transverse dimensions of said frame member are no greater than half its vertical dimensions and are less than six inches.

5. The structure defined in claim 2, wherein said cradle member has narrow forward portions and diverges rearwardly therefrom.

6. The structure defined in claim 2, wherein the rear section of said frame member and its upwardly and forwardly extending section are of approximately equal length.

7. A self-propelled vehicle for removing bodies from brushy relatively inaccessible locations comprising a narrow elongated rigid frame member having a horizontally extending rear section and a forward section extending forwardly and upwardly therefrom, said frame member having upper and lower longitudinally extending track-bearing surfaces, narrow crawler-type track means trained around said forward and rearward section of said frame member and revolvably mounted thereupon in driving and encircling relation and extending longitudinally thereof and bearing against said surfaces, a relatively broad cradle member superimposedly mounted on said frame member and extending longitudinally thereof, said cradle member having a relatively broad flat bottom extending laterally outwardly at both sides of said frame member and functioning as a toboggan when said vehicle is operated in deep snow, self-contained power means carried by said frame and connected to said track means in driving relation to cause the same to revolve about said frame member and thereby propel the same across terrain, and handle means carried by one of said members adjacent the rear of said frame member for maintaining the vehicle in upright position and guiding the same across rough and relatively inaccessible terrain.

8. A self-propelled vehicle for moving bodies from relatively inaccessible locations comprising a narrow elongated rigid frame member having a horizontally extending rear section and a forward section extending forwardly and upwardly therefrom, said frame member having upper and lower longitudinally extending track-bearing surfaces, narrow crawler-type track means trained around said forward and rearward sections of said frame member and revolvably mounted thereupon in driving and encircling relation and extending longitudinally thereof and bearing against said surfaces, a relatively broad cradle member superimposedly mounted on said frame member and extending longitudinally thereof, said cradle member having a relatively broad flat imperforate bottom extending laterally outwardly at both sides of said frame member and functioning as a toboggan when said vehicle is operated in deep snow, self-contained power means carried by said frame and connected to said track means in driving relation to cause the same to revolve about said frame member and thereby propel the same across terrain, and handle means carried by one of said members adjacent the rear of said frame member for maintaining the vehicle in upright position and guiding the same across rough and relatively inaccessible terrain.

References Cited in the file of this patent

UNITED STATES PATENTS

| | | |
|---|---|---|
| 1,404,882 | Moore | Jan. 31, 1922 |
| 1,450,385 | Prince | Apr. 3, 1923 |
| 2,393,309 | Cochran | Jan. 22, 1946 |
| 2,607,277 | Shelor | Aug. 19, 1952 |
| 2,827,972 | West | Mar. 25, 1958 |
| 2,846,017 | Luchterhand | Aug. 5, 1958 |
| 2,973,822 | Merry | Mar. 7, 1961 |
| 2,996,133 | La Warre et al. | Aug. 15, 1961 |

FOREIGN PATENTS

| | | |
|---|---|---|
| 198,138 | Austria | June 10, 1958 |
| 910,372 | France | Jan. 28, 1946 |